United States Patent

[11] 3,623,138

| [72] | Inventor | John A. Joslyn |
| | | Dalton, Mass. |
| [21] | Appl. No. | 853,187 |
| [22] | Filed | Aug. 26, 1969 |
| [45] | Patented | Nov. 23, 1971 |
| [73] | Assignee | General Electric Company |
| | | Continuation-in-part of application Ser. No. 479,550, Aug. 13, 1965, now abandoned. |

[54] LINEAR DC VOLTAGE TO FIRING ANGLE CONVERTER CIRCUIT
6 Claims, 3 Drawing Figs.

[52] U.S. Cl. .................................................. 318/345, 318/681, 307/252 N, 307/252 J, 307/301
[51] Int. Cl. ............................................................ H02p 5/16
[50] Field of Search ............................................. 307/262, 301, 252 N, 252 J; 318/345

[56] References Cited
UNITED STATES PATENTS

| 3,092,760 | 6/1963 | Manners et al. | 307/301 |
| 3,061,747 | 10/1962 | Schlicher et al. | 307/301 |
| 3,192,462 | 6/1965 | James | 307/301 |
| 3,192,466 | 6/1965 | Sylvan et al. | 307/262 |
| 3,226,627 | 12/1965 | Fromkin | 307/301 |
| 3,244,965 | 4/1966 | Gutzwiller | 307/262 |
| 3,259,825 | 7/1966 | James | 307/301 |
| 3,348,131 | 10/1967 | Banks | 307/262 |
| 3,333,175 | 7/1967 | Klyce | 307/142 |
| 3,360,713 | 12/1967 | Howell | 307/301 |

Primary Examiner—Donald D. Forrer
Assistant Examiner—Harold A. Dixon
Attorneys—Frank L. Neuhauser, Francis K. Richwine, Oscar B. Waddell, Joseph B. Forman and Carl W. Baker ABSTRACT: A triggering circuit for a controlled rectification system is provided which supplies firing pulses to the rectifiers at some phase angle determined by an input DC error signal. The firing circuit uses a unijunction transistor having a pulse output transformer coupled to the transistor output circuit for application of firing pulses to the gate-cathode circuit of the controlled rectifier. A DC error voltage is applied to one of the base electrodes of the unijunction transistor and a phasing voltage is coupled to its emitter electrode for synchronization of the triggering pulse with an AC voltage applied to the associated rectifier of the rectification system. A preferred application of the firing circuit is to control a reversible DC motor utilizing an SCR power amplifier in a servomechanism or regulating system.

INVENTOR
JOHN A. JOSLYN
BY John J. McDevitt
HIS ATTORNEY

LINEAR DC VOLTAGE TO FIRING ANGLE CONVERTER CIRCUIT

This application is continuation-in-part of my copending application entitled "Linear DC Voltage to Firing Angle Circuit," Ser. No. 479,550, and filed Aug. 13, 1965.

BACKGROUND OF THE INVENTION

This invention relates to a unifunction transistor firing circuits for controlled rectification systems and more specifically to such circuits which are controlled by an input signal.

A common application for controlled rectification systems is to supply a DC motor with a rectified AC line voltage, the average value of which is desired to be variable depending in an input signal. The average value of the rectified voltage is dependent upon the length of time during an AC half cycle that the rectifier is conducting. Typical rectifier elements for said control rectification system include an ignatron or thyratron, as exemplary of gas-filled type devices, or the newer solid-state devices such as silicon-controlled rectifier (SCR). If the rectifier is chosen such that its conducting cycle is initiated by a trigger pulse at a controlled electrode of the rectifier, then the average value of the voltage supplied by the rectifier is a function of the time during the AC cycle at which the trigger pulse is supplied to the control electrode of the rectifier. A triggering circuit for a controlled rectification system is therefore a circuit which supplies firing pulses to the rectifiers at some phase angle, which phase angle is determined by an input signal.

A known servomechanism application uses a reversible DC motor as a prime mover for a servo positioning system such as a gun mount. In such a system the DC motor is driven with electrical voltage of a polarity and magnitude which is dependent upon an error feedback signal in a servo amplifier. To accomplish this a phase-controlled power amplifier is often used to supply the proper voltage to the motor. The power amplifier may comprise three sets of two SCR's connected reversely in parallel, each set respectively connecting one phase of a three phase AC power line to the motor. Depending on whether the motor is to be driven in the forward or reverse direction, the three respective SCR's poled in the positive or negative direction will be rendered conductive in order to put DC voltage across the motor of the desired polarity. Depending on the desired magnitude of DC voltage, the error signal from the servo amplifier is caused to gate the desired SCR's into conduction at a proper phase angle of the AC half cycle. By regulating the phase angle at which the SCR's trigger into conduction, the average DC voltage delivered by the SCR's can be varied. A detailed description of the position servomechanism system is contained in my copending application entitled "Phase Controlled Power Amplifier Lockout circuit," Ser. No. 493,643 and now issued U.S. Pat. No. 3,431,497.

When a silicon-controlled rectifier is used as the rectifier in the controlled rectification system such as a phase controlled power amplifier driving a DC motor load, a common firing circuit comprise a unijunction transistor with a pulse output transformer coupled to the transistor's output circuit and to the gate-cathode circuit of the silicon-controlled rectifier. It has been the normal practice to supply the input base electrode of the unijunction transistor with a phasing voltage which is dependent on the phase angle of the AC voltage and to supply the input emitter electrode of the unijunction transistor with a DC error signal developed at the load. Thus, in accordance with prior unijunction transistor operation, when the DC error voltage at the emitter electrode raises to a certain predetermined fraction of the phasing voltage present at the input base electrode, the transistor will fire and dump a trigger pulse into the pulse output transformer coupled to one base electrode of said transistor. It has been found that when the unijunction transistor is operated in this manner, a nonlinear relationship exists between the input DC error signal and the phase angle at which the unijunction transistor fires. In order to supply variable power to the DC motor through a wide range, the phase angle at which the SCR fires must also be variable throughout this wide range and while achieving this, it has been found advantageous to maintain a linear transfer characteristic between said DC input voltage and the phase angle. This linear transfer characteristic is especially advantageous for a servomechanism or regulating system in which feedback is used.

In the above type motor-controlled systems the firing circuit must perform the function of converting a DC error signals to a trigger pulse with the proper phasing for the particular controlled SCR. To do so properly, the firing circuit must be synchronized with the AC line voltage to permit the firing circuit to function only during a well-defined period of time.

SUMMARY OF THE INVENTION

It is therefore an object of this invention to obtain a firing circuit for a controlled rectification system in which the relationship between the input DC control voltage and the phase angle at which the circuit fires is linear.

Another object of this invention is to provide a firing circuit for a controlled rectification system having operational advantages for servomechanism applications.

Still another object of this invention is to provide a firing circuit broadly useful in servomechanism and other power regulation systems.

These and objects are achieved with a unijunction transistor firing circuit in which the unijunction transistor is operated in the inverted mode, that is, the input DC control signal is applied to the input base electrode rather than the emitter electrode and the phasing voltage is applied to the emitter electrode rather than to the input base electrode.

In a preferred form of the invention, the unijunction transistor firing circuit is used to convert the DC error signal to the proper firing angle for each SCR of the phase control power amplifier in the reversible DC motor control system above defined. The phasing voltage applied to the circuit is such that the firing angle of the controlled SCR associated with it can be advanced or retarded with respect to one of the zero crossings of the applied AC line voltage so that maximum torque and regenerative braking can be realized in the particular driven motor. When the proper polarity of the phasing voltage is applied to the circuit a transistor constant current source generated a voltage ramp at the emitter of a unijunction transistor and depending on the DC error voltage value at that point in time unijunction transistor reaches a threshold level or firing point to generate a trigger pulse which can gate the associated power SCR into conduction. The firing circuit also has potentiometers to adjust the initial value and slope of the voltage ramp generated at the emitter of the unijunction transistor. The threshold level of the unijunction transistor is changed as a linear function of the control voltage such that a unit change in control voltage causes the firing angle to change by a fixed number of units for all values of control voltage. A capacitor element in the circuit is discharged by the phasing voltage whether or not the threshold of the unijunction transistor has been reached or not during that period of time when the firing circuit is not permitted to function due to the phasing voltage input.

A different unijunction transistor firing circuit is described in issued U.S. Pat. No. 3,487,236, in the name of Carlton E. Graf, dated Dec. 30, 1969, and assigned to the assignee of the present invention. In said disclosure, a timing capacitor and a platform voltage are connected in series across the emitter electrode and one base electrode of a negative resistance unijunction transistor to control the timing period between successive output pulses of a time delay control circuit. The capacitor is charged at a predetermined rate to provide timing signals for driving the transistor into its negative resistance mode of operation. While the continuous platform voltage signal controls the timing period between successive output pulses, this signal is prevented from charging the capacitor, thereby allowing instantaneous response to desired changes in the timing period. A second, more rapidly charged capacitor may be used as an auxiliary energy source to assure that there is sufficient current available to turn on the transistor when it is driven into its negative resistance mode of operation. In another embodiment of said invention, a unijunction transistor is fired independently of its breakdown voltage level.

DESCRIPTION OF A PREFERRED EMBODIMENT

Figure 1:
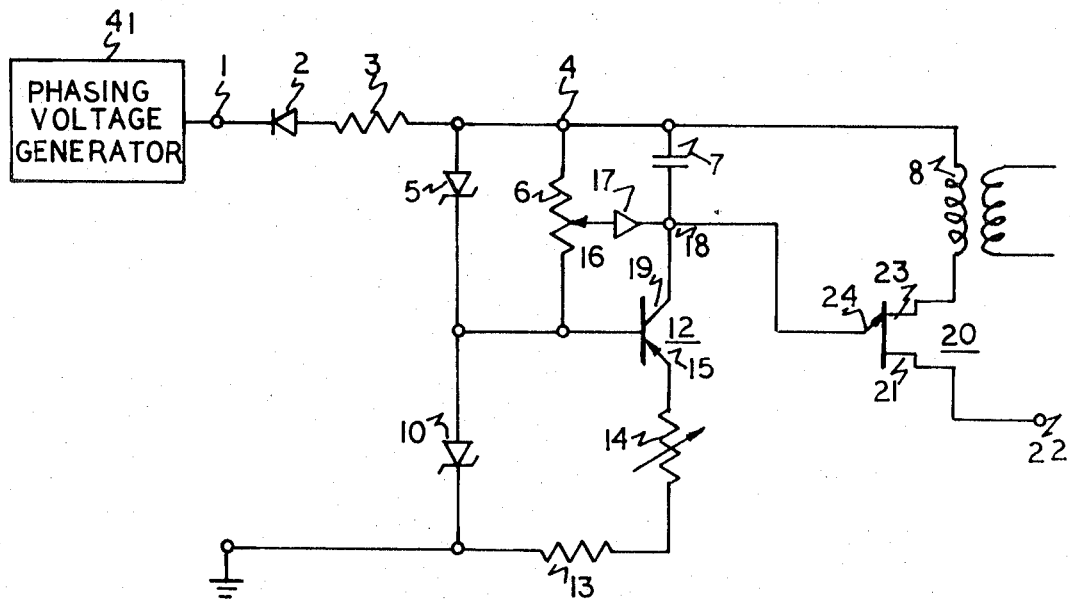
FIG. 1 is a circuit diagram of a unijunction transistor firing circuit according to the teachings of the present invention.

In order to illustrate a typical application of the unijunction firing circuit of this invention, reference is made to the circuit diagram shown in FIG. 1. A firing circuit adapted for use with an SCR power amplifier is disclosed as a means of controlling a reversible DC motor in a controlled rectification system. Accordingly, a terminal 1 is coupled to a phasing voltage generator in a manner more particularly described hereinafter, for connection to a diode 2, and a dropping resistor 3, to a junction point 5, which point is common to the anode electrode of a Zener diode 5, one side of a potentiometer resistor 6, one side of a capacitor 7, and one end of the primary winding of a pulse output transformer 8. The cathode of the Zener diode 5 is connected to a junction point 9 and to the anode of another Zener diode 10, the cathode of which is grounded. The end of the potentiometer resistor 6 opposite the junction point 4 is connected to the junction point 9 and to the base electrode 11 of a transistor 12. A dropping resistor 13 and an adjustable resistor 14 are connected in series between ground and the emitter electrode 15 of the transistor 12. A movable contact 16 for the potentiometer resistor 6 is connected through the anode-cathode path of a diode 17 to a junction point 18, which point is connected to the side of the capacitor 7 opposite to the junction point 5 and also to the collector point 19 of the transistor 12. The junction point 18 is connected to the emitter electrode 24 of a unijunction transistor 20. The base 1 electrode 23 of the unijunction transistor 20 is connected to the end of the primary winding of the pulse output transformer 8 opposite the junction point 5. The base 2 electrode 21 of the unijunction transistor 20 is connected to a terminal 22 which is adapted to be connected to a source of signal voltage such as that taken from the output of a servoamplifier associated with the DC motor and load (not shown). The secondary winding of the pulse output transformer 8 is adapted to be coupled to the gate-cathode circuit of a silicon-controlled rectifier in the power amplifier which is also not shown.

In the operation of the circuit of FIG. 1 a phasing voltage which is synchronized with the AC line voltage to the power amplifier is applied to terminal 1 and is half wave rectified by diode 2 so that a voltage negative with respect to ground is applied to the junction terminal 4. When the phasing voltage is negative, the dropping resistor 3 limits the voltage applied to the junction terminal 4 to approximately the combined Zener voltages of the Zener diodes 5 and 10. During this time period, Zener diode 5 acts to maintain a constant potential across the potentiometer resistor 6 and Zener diode 10 acts to maintain a constant potential between the junction terminal 9 and ground. The total series resistance of the resistors 13 and 14 can be adjusted such that the current through these resistors remains constant. Transistor 12 acts as a constant current source, which constant current is taken from the collector electrode 19 of the transistor and supplied to the junction point 18. The value of this constant current can be set by adjusting the adjustable resistor 14. The circuit between the junction point 4 and junction point 18 including part of the potentiometer resistor 6, the movable contact 16 and the diode 17 functions to produce a predetermined initial voltage across the capacitor 7 for each negative half cycle of the AC phasing voltage. More generally, this circuit permits selecting the magnitude of the voltage across capacitor 7 at a predetermined level for a given phase angle of the phasing voltage by adjusting potentiometer 6. The diode 17 blocks the flow of the constant output current from the collector electrode 19 of the transistor 12 from the resistor 6. The voltage wave form across the capacitor 7 will therefore be a constant slope ramp which initially begins at a finite predetermined voltage level and repeats every negative cycle of the phasing voltage. As the slope is dependent upon the magnitude of the constant current, it can be seen that the slope may be changed by varying the setting of adjustable resistor 14. The magnitude of the voltage across capacitor 7 for a given phase angle of the phasing voltage thus is a function of the adjustment of both potentiometer 6 and adjustable resistor 14. When the unijunction transistor 20 fires, the energy stored in the capacitor 7 comes through the emitter 24 base 23 path of the unijunction transistor 20 and into the primary winding of the pulse output transformer 8.

During the next half cycle of AC power the voltage across the SCR reverses and it shuts off. In addition diode 2 prevents the positive phasing voltage half cycle from being applied to terminal 4 and thus the firing circuit is inoperative. When the next cycle of phasing voltage occurs, the capacitor again begins to charge until the phase angle is such that the emitter voltage is sufficient to fire the unijunction transistor 20.

The characteristics of the unijunction transistor 20 are typical in that a relatively high impedance is displayed between its emitter electrode 24 and its base 1 electrode 23 whenever the emitter voltage is below a certain fraction of the voltage between the base 1 and base 2 electrodes. When the emitter voltage is raised to this predetermined threshold level or firing point, the unijunction transistor breaks down and displays a low impedance between its emitter and its base 1 electrode thereby allowing current to flow there between and to the primary winding of the pulse output transformer 8. Since the emitter voltage of the unijunction transistor 20 is essentially the voltage present at the junction point 18, this emitter voltage increases linearly with the charging voltage across the capacitor 7. Thus it can be seen that the magnitude of the emitter voltage or triggering voltage of the unijunction transistor 20 is a function of time or phase angle of the phasing voltage present at the terminal 1. On the other hand, the voltage between the base 1 and base 2 electrodes 21 and 23 of the unijunction transistor 20 is a function of the DC signal voltage present at the terminal 22. Thus from the characteristics of unijunction transistor operation above described, it can be seen at the time of turn on of the SCR's in the power amplifier, or the time at which the unijunction transistor 20 breaks down and allows the energy stored in the capacitor 7 to come through the primary of the pulse output transformer 8, is when the emitter voltage which is a function of phase angle of the phasing voltage is equal to a predetermined constant fraction of the base-to-base voltage, which is a function of the DC signal. Since the turn-on or emitter voltage is always proportional to the DC signal voltage, and since the emitter voltage varies linearly with phase angle of the phasing voltage, then the phase angle at which the unijunction turns on is linearly related to the DC signal voltage.

Figure 2:
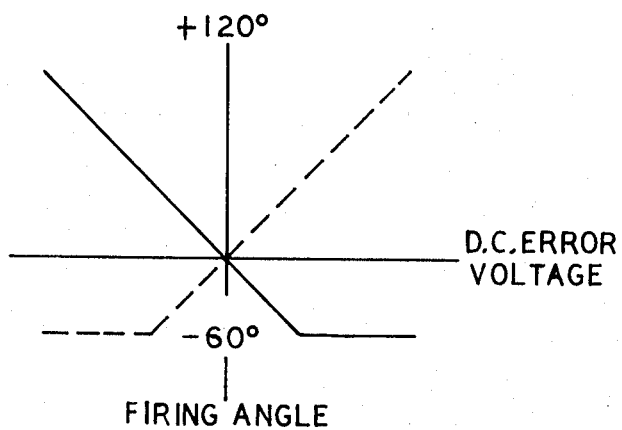
FIG. 2 is a graphical representation of the transfer characteristic or gain in the circuit of FIG. 1.

An exemplary system requirement for such a phase-controlled power amplifier is that the possible firing angles for the SCR's should span the range from −60° to +120° of the SCR anode voltage. A linear transfer characteristic for such a system utilizing a firing circuit according to the present invention is shown in FIG. 2. The solid line indicates the characteristic of firing circuits used to fire SCR's connected for current flow in the positive direction and the dashed line is characteristics of the firing circuits used to fire SCR's connected for current flow in the negative direction. The input to the firing circuit is clamped by conventional circuit means to limit the firing angle advance or retard to the aforementioned angular values. The crossing point of the firing angle ordinate with the DC error voltage abscissa in FIG. 2 represents zero control voltage being applied to the firing circuit whereas increasing negative control voltages are represented to the right of said intersection. Since unijunction transistors are single polarity devices, some means to invert the polarity of the DC input signal is needed to fire the SCR's connected in the negative direction. Inverting amplifiers are one possible means to accomplish this.

Figure 3:
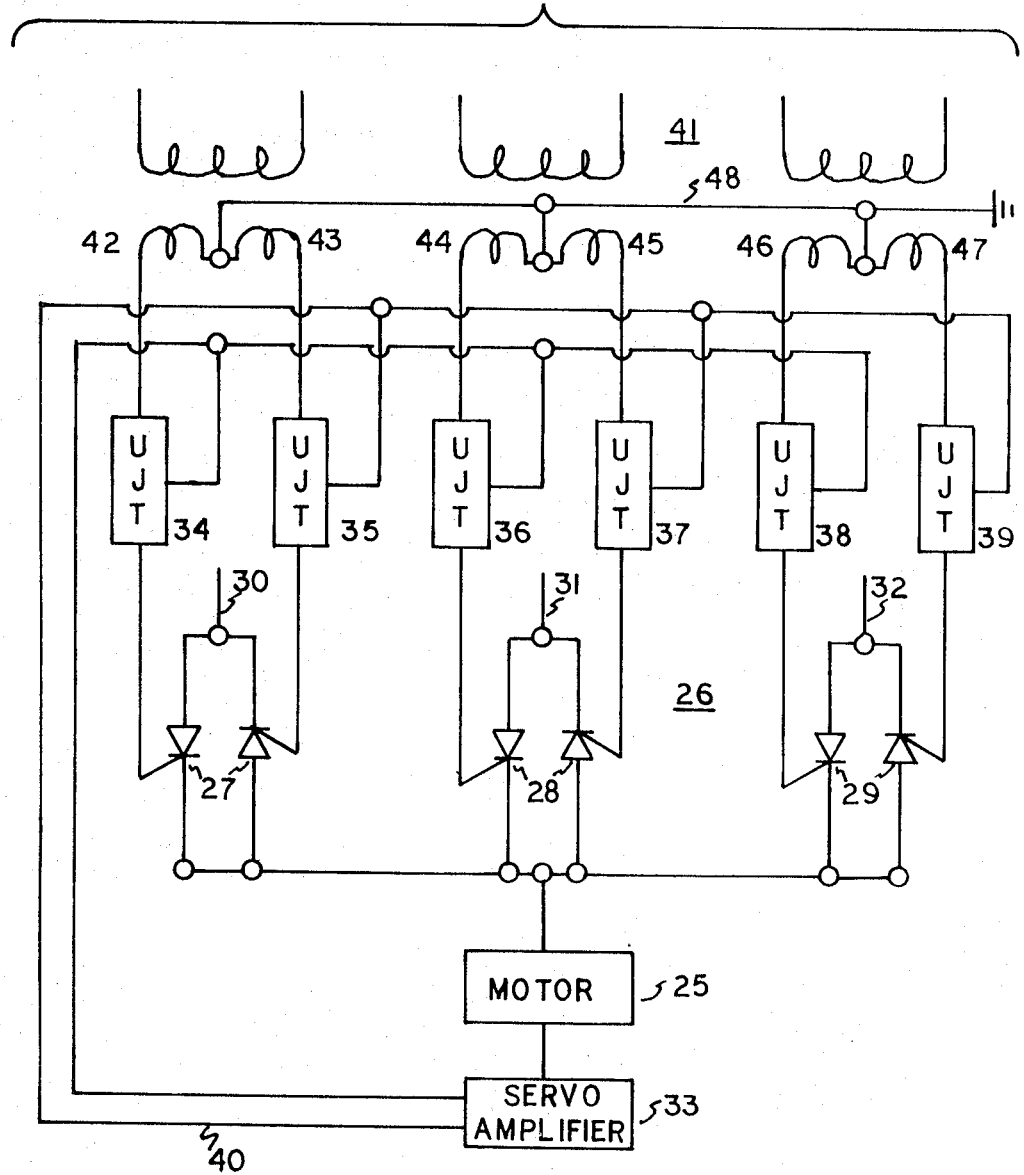
FIG. 3 is a block diagram of the power circuit for a reversible DC motor control system utilizing the unijunction transistor firing circuits of the present invention.

A block diagram of the basic power circuitry for a reversible DC motor servo mechanism utilizing the firing circuits of the present invention is shown in FIG. 3. Accordingly, a reversible DC motor 25 is supplied with rectified AC line voltage from a phase controlled power amplifier 26 which comprises three sets of two SCR's connected reversibly in parallel, 27, 28 and 29, each of said sets connecting one phase of a three phase AC power line by means of conductors 30, 31 and 32, respectively. An error signal from servoamplifier 33 provides a DC control voltage to particular unijunction firing circuits 34–39 associated with he controlled rectifier elements depending on whether said motor is to be driven in the forward or reverse direction. A more detailed description of the manner in which a DC error signal can be coupled to the individual firing circuits so as to gate associated SCR's into conduction and supply a DC voltage across the motor of the desired polarity is found in my aforementioned issued U.S. Pat. No. 3,431,479. The error signal supplied by conductor 40 to an individual firing circuit is supplied to the base electrode 22 of the unijunction transistor 20. A phasing voltage generator 41 in the form of a transformer having its primary windings across each phase of the three-phase power line and having six-phase secondary windings 42–47 for connection to each terminal 1 in all firing circuits provides a suitable source of phasing voltage. The secondary windings of said phasing transformer also have a common ground connection 48.

In operation, the phasing voltage is supplied across the firing circuit at a magnitude appropriate for use with the associated semiconductor elements, such as 25 volts. As previously mentioned the function performed by the unijunction transistor 20 in each firing circuit is to convert the applied DC error signal to a trigger pulse with the proper phasing for control of the associated SCR. The phase of the phasing voltage is directly related to the phase of the voltage applied to the controlled rectifier (SCR) and said phasing voltage is converted to a constant amplitude pulse for application to the base electrode of the control transistor 12 in the firing circuit. The amplitude of the pulse does not vary with value of the DC error signal and thus produces a ramp waveform at the emitter of the unijunction transistor having a constant slope and which varies linearly in magnitude with respect to the phase angle of the phasing voltage. Since the emitter voltage and the base-to-base voltage of the unijunction transistor which latter voltage is directly proportional to the DC error signal, are related by a constant, the unijunction transistor firing pulse is obtained at a threshold level which varies lineary with respect to phase angle as the DC error signal changes. By contract thereto, the ramp waveform at the emitter of the unijunction transistor will have a variable slope when the DC error signal changes if said error signal is applied to the emitter electrode hence there would be a nonlinear variation of firing angle with respect to the value of the DC error signal.

What is claimed as new and desired to secure by Letters Patent of the United States is:

1. For use in a motor control system comprising reversible DC motor means and power amplifier means including controlled rectifier means for applying electrical energy from an alternating current source to said motor means; unijunction transistor triggering circuit means including a unijunction transistor having an emitter electrode and base 1 and base 2 electrodes, means to apply a varying DC error voltage to the base 2 electrode, means including a constant current charging source and a capacitor to supply a voltage waveform to the emitter electrode of said unijunction transistor in the form of a constant slope ramp which initially begins at some finite predetermined voltage level and is synchronized with the alternating current source whereby energy stored in said capacitor is discharged from the base 1 electrode of said unijunction transistor when the threshold value of said unijunction transistor is exceeded to supply a firing pulse to the controlled rectifier means.

2. Unijunction transistor triggering circuit means for use in a motor control system according to claim 1 which further includes means for determining the slope of the linear relationship of the voltage waveform applied to the emitter electrode as a function of the phase angle of the alternating current source.

3. Unijunction transistor triggering circuit means for use in a motor control system according to claim 2 wherein the phase angle at which the unijunction transistor generates a firing pulse varies linearly with the DC error voltage.

4. For use in a motor control system comprising reversible DC motor means and power amplifier means including controlled rectifier means for applying electrical energy from an alternating current source to said motor means; unijunction transistor triggering circuit means including a unijunction transistor having an emitter electrode and base 1 and base 2 electrodes, means to apply a varying DC error voltage to the base 2 electrode, capacitor means charged by a constant current source connected to the emitter electrode means connected to said emitter electrode for providing an initial voltage level and means connected to said emitter electrode for providing a linear ramp voltage in synchronization with the alternating current source whereby energy stored in said capacitor means is discharged from the base 1 electrode of said unijunction transistor when the threshold value of said unijunction transistor is exceeded to supply a firing pulse to the controlled rectifier means.

5. Unijunction transistor triggering circuit means for use in a motor control system according to claim 4 wherein said means for providing a voltage at said emitter electrode comprises a source of constant current couple to a source of phasing voltage and a capacitor coupled to said source of constant current and to said emitter electrode.

6. Unijunction transistor triggering circuit means for use in a motor control system according to claim 5 wherein said source of constant current includes means to preset the magnitude of constant current.

* * * * *